C. F. FREIHOFER.
VEHICLE SUSPENSION.
APPLICATION FILED APR. 12, 1916.
1,244,312.
Patented Oct. 23, 1917.
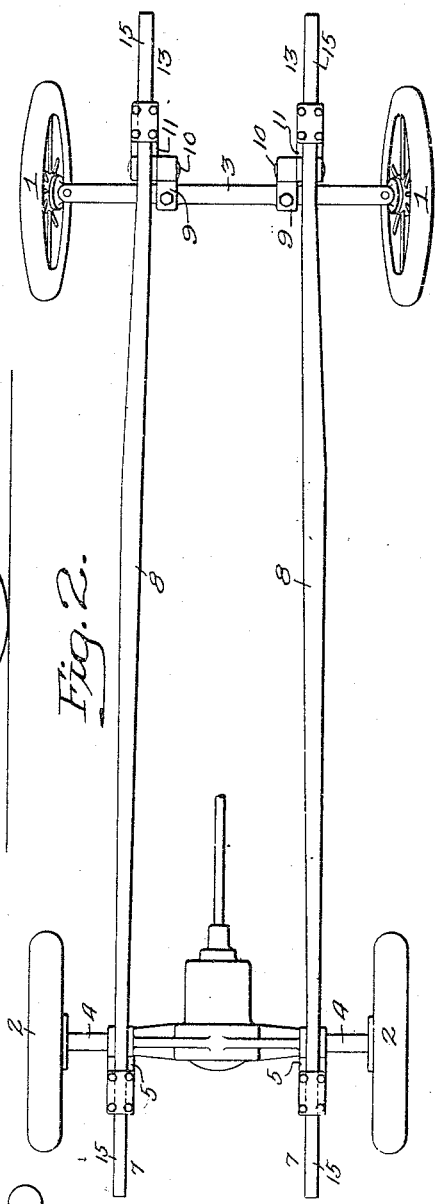
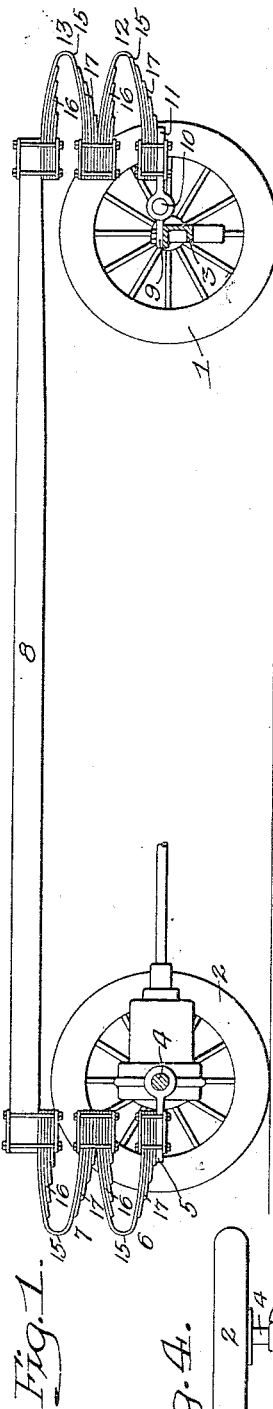
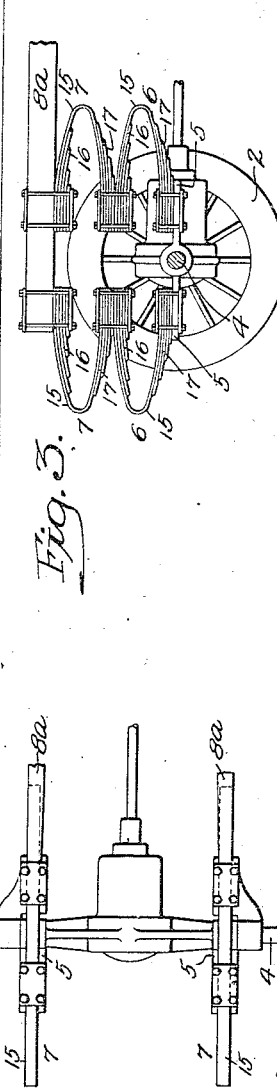
Inventor
Charles F. Freihofer
by his Attorneys
Howson & Howson

UNITED STATES PATENT OFFICE.

CHARLES F. FREIHOFER, OF PHILADELPHIA, PENNSYLVANIA.

VEHICLE SUSPENSION.

1,244,312.　　　　Specification of Letters Patent.　　Patented Oct. 23, 1917.

Application filed April 12, 1916. Serial No. 90,632.

*To all whom it may concern:*

Be it known that I, CHARLES F. FREIHOFER, a citizen of the United States, residing in Philadelphia, Pennsylvania, have invented a Vehicle Suspension, of which the following is a specification.

One object of my invention is to provide novel means for connecting the frame of a vehicle to the axles thereof with a view to diminishing the intensity of the shocks transmitted to said frame when one or more of the wheels pass over obstructions, said invention contemplating more particularly a novel means for connecting the supporting spring or springs to the axle.

Another object of the invention is to provide a novel form of spring connection between the axle and the frame of a vehicle which in addition to being simple and substantial shall to a great extent absorb the shocks delivered to the axle when the wheels pass over obstructions or rough ground.

These objects and other advantageous ends I secure as hereinafter set forth, reference being had to the accompanying drawings, in which, Figure 1 is a side elevation partly in section of a portion of the frame and the axles of a vehicle, together with the parts associated therewith arranged according to my invention;

Fig. 2 is a plan of the structures shown in Fig. 1; and

Figs. 3 and 4 are respectively a side elevation, partly in section, and a plan of a slightly modified form of the invention.

In the above drawings 1 represents the front wheels and 2 the back wheels of a vehicle having a front axle 3 and a rear axle 4. Rotatably mounted on the latter are a pair of brackets 5 preferably, though not necessarily, extending to the rear and each rigidly connected to the lower member of a semi-elliptic spring 6. The upper member of this spring in turn is connected to the lower member of a second similar spring 7 to whose top member is connected the rear end of one of the side frame members 8 of the vehicle.

The front axle 3 has fixed to and forwardly extending from it a pair of fixed brackets 9 each carrying a pivot pin 10 which extends transversely of the line of the vehicle and serves to rotatably support a bracket 11 connected to the lower member of a semi-elliptic spring 12. The top member of this latter is connected to the lower member of a second similar spring 13 whose top member serves to support the forward end of one of the side frame members 8.

With this arrangement of parts the sudden rising of either of the axles 3 or 4 due to the passage of the wheels over some unevenness or obstruction in the road, instead of directly acting on the lower member of the spring 6 or 12 as the case may be, acts instead on the overhung end of the bracket 11 or 5, which thereupon turns on the pivot spindle 10 or upon the axle 4 before transmitting the effect of such sudden movement to the spring. As a consequence of this construction and action the pivotally mounted brackets with the springs serve as shock absorbers and cause the vehicle to ride more lightly than would ordinarily be the case.

In Figs. 3 and 4 I have shown my invention as applied to a vehicle in which two pairs of springs are interposed between each end of one of the axles and the adjacent part of a vehicle frame or frame member, and with this idea in view I provide at each end of the axle 4 a pair of oppositely extending brackets 5 respectively connected to the lower members of a pair of springs 6 and 7 of the same construction as that shown in Fig 1. Both of these pairs of springs have their uppermost members connected to the side frame members 8ª of the vehicle and as before the brackets 5 are rotatable on the shaft 4 as an axis whenever the wheels 2 suddenly rises or passes across a rut or obstruction.

While any suitable form of springs may be used with the pivoted brackets above described, I preferably make said springs in the manner shown in the drawings, with one main body 15 of a strip material bent at the middle and curved into the form of a half ellipse, reinforcing this with successively shorter leaves or strips 16 on the inner side of its top members and with a second series of successively shorter strips 17 on the under side of its lower member.

Obviously springs of forms other than those shown may be employed and these may be disposed in any suitable manner without departing from my invention.

I claim:—

1. The combination of a vehicle frame; and means for supporting said frame including an axle, a semi-elliptic spring having one end rotatably connected to the axle and its second end free, and a second spring having a free end connected to the free end of the first spring and its other end connected to the frame.

2. The combination of a vehicle frame; and means for supporting said frame including brackets rotatably mounted on the axle and each including a horizontally projecting plate; with semi-elliptic springs respectively connected to said projecting plates and carrying the frame.

3. The combination of a vehicle frame; and means for supporting the same consisting of an axle; two sets of oppositely extending brackets rotatably mounted on the axle; and two sets of oppositely extending springs respectively connected to the brackets of the two sets and carrying the adjacent parts of the frame.

4. The combination of a vehicle frame; and means for supporting the same including a pair of wheels; an axle for said wheels; brackets rotatably mounted on the axle and projecting therefrom in substantially horizontal lines; with springs rigidly connected to the brackets respectively and also rigidly connected to the frame.

5. The combination of a vehicle frame; and means for supporting the same including an axle; with springs supported by said axle and engaging the frame, said springs each comprising semi-elliptic structure including a continuous semi-elliptic strip and reinforcing leaves of successively decreasing lengths mounted on the under portions of the top and bottom members of said strip respectively.

6. The combination of a vehicle frame; an axle; with springs connecting said frame and the axle and each consisting of two superimposed semi-elliptic members each formed of a continuous length of spring strip material shaped into upper and lower portions; and reinforcing leaves mounted on the under sides of the upper and lower members of each spring.

CHARLES F. FREIHOFER.

Copies of this patent may be obtained for five cents each, by addressing the "Commissioner of Patents, Washington, D. C."